United States Patent Office 3,512,062
Patented May 12, 1970

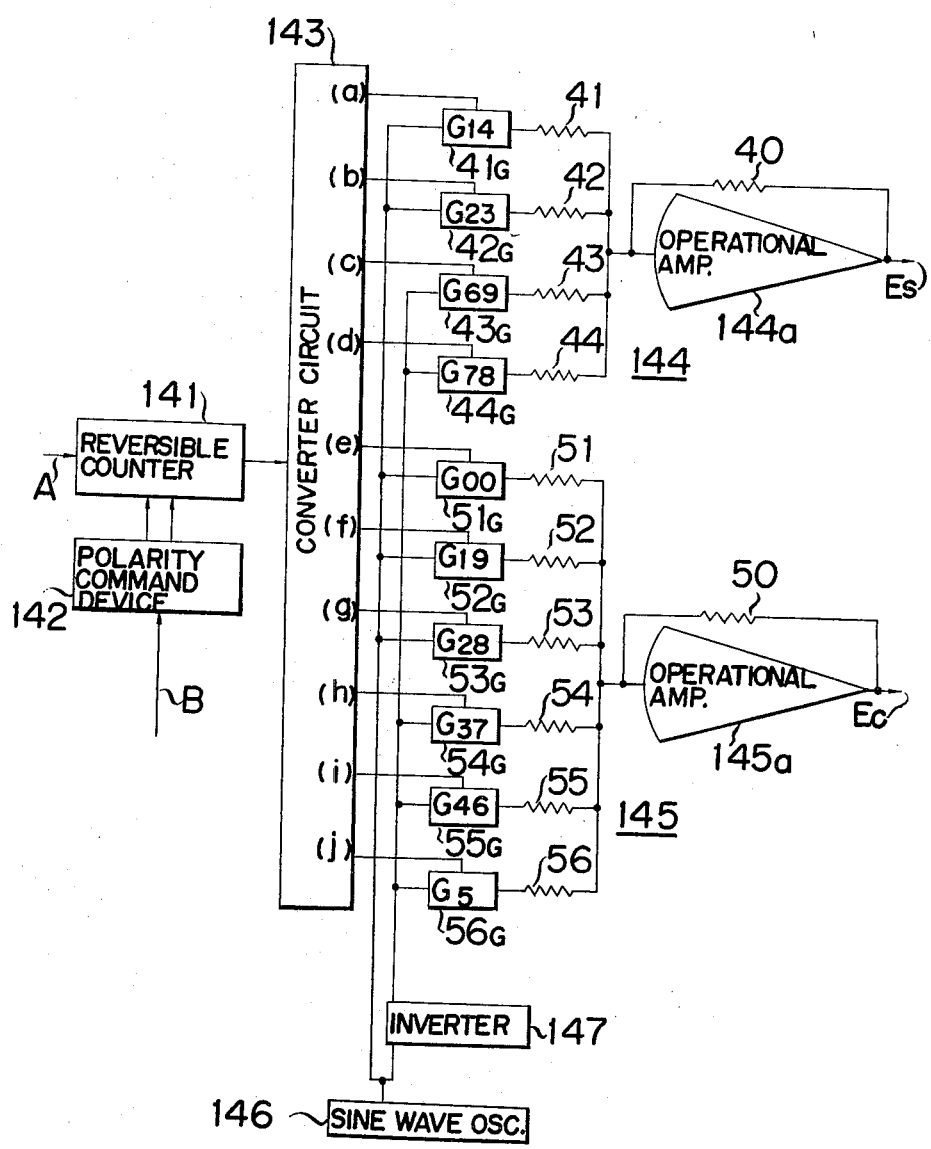

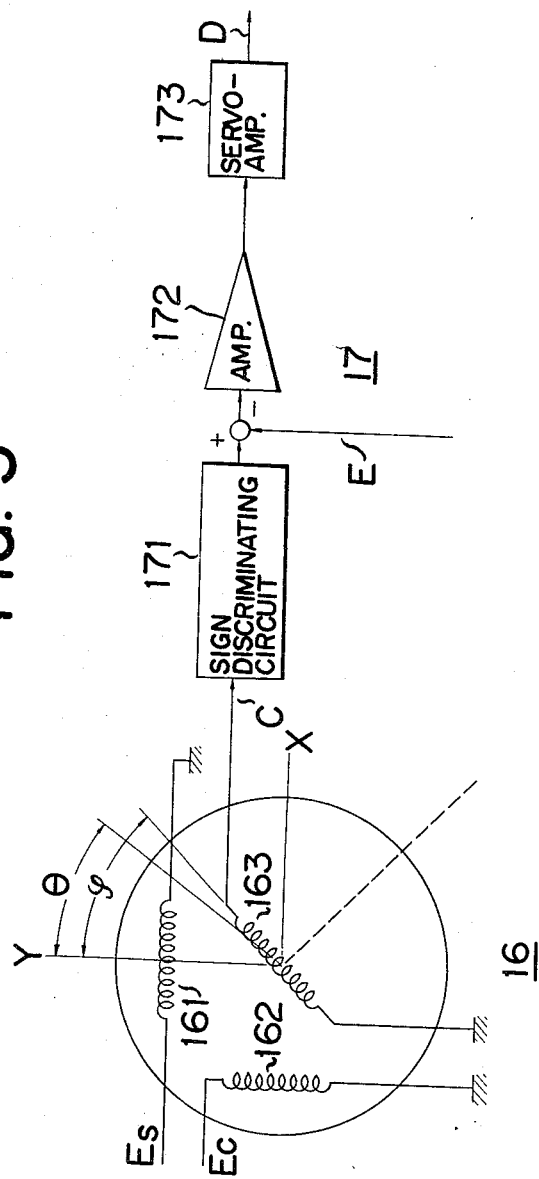

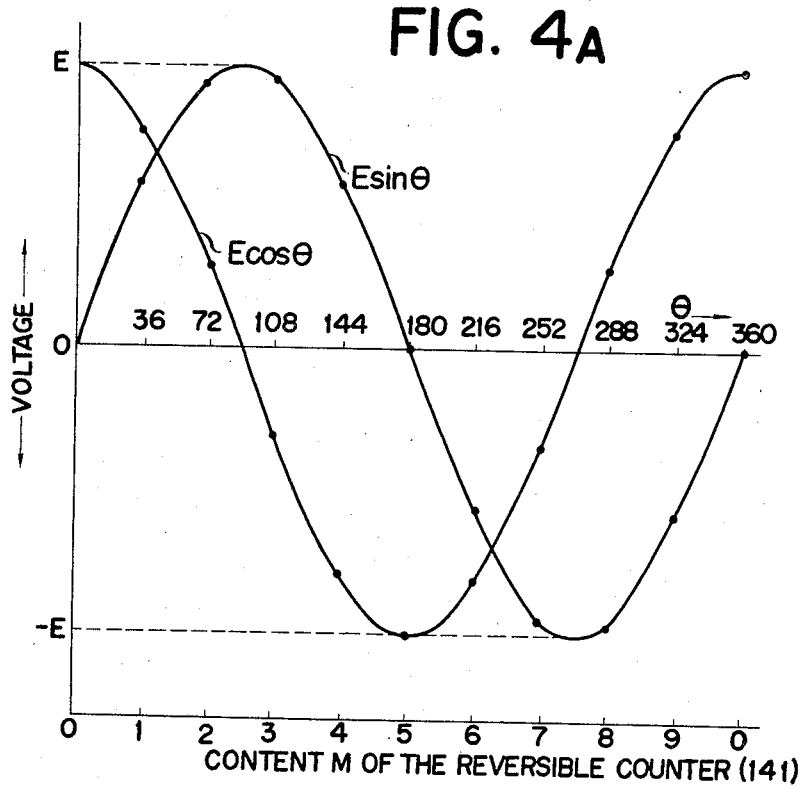

3,512,062
POSITION CONTROL APPARATUS
Takaomi Aoki, Tokyo, Japan, assignor to Tokyo Shibaura Electric Co., Ltd., Kawasaki-shi, Japan, a corporation of Japan
Filed Oct. 31, 1967, Ser. No. 679,438
Claims priority, application Japan, Nov. 7, 1966, 41/72,859
Int. Cl. G05b 19/04
U.S. Cl. 318—18    5 Claims

ABSTRACT OF THE DISCLOSURE

A position control apparatus wherein a current magnetic field expressed in terms of vector corresponding to a command information is produced by an electronic means in a position pickup having winding devices for detecting the error between the position of a movable member and a target position corresponding to the command information, whereby the movable member is moved in such a manner that the output of the position pickup device becomes null.

---

This invention relates to a position control apparatus which controls the position of such a moving member as processing tools and work pieces, and especially to a position control apparatus for controlling the position of a moving (or movable) member according to the command information for position expressed by pulses, as is often used in numerical control of machine tools.

On operating a machine tool automaatically according to a predetermined schedule, many methods are employed in which commands recorded on a tape or a card are read, and the processing work is advanced by positioning the work piece or work tool to a predetermined position. The so-called numerical control method, in which various controls associated with numerical values are conducted, is used in many cases because command information is more conveniently recorded on a card or a tape in a digital quantity than in an analog quantity.

Therefore in such a position control apparatus the command designating the position of a moving member (work piece, tool, etc.), that is the objective of position control, is expressed by a numeric composed of pulses and a sign. The reason for employing such a numerical control system lies not only in automating machine operation but also in enabling an accurate and rapid control of a machine to be realized without complex techniques.

An object of this invention is to provide a position control apparatus capable of positioning a moving member accurately and rapidly according to the command information expressed with pulses.

Another object of this invention is to provide a position control apparatus capable of determining accurately the completion of a positioning operation of a moving member.

The present invention will be better understood from the following description taken in connection with the accompanying drawings, in which:

FIG. 2 is a block diagram of a vector generating circuit of the apparatus shown in FIG. 1;

FIG. 3 is an illustrative detailed diagram of a position pickup and servo amplifier shown in blocks in FIG. 1;

FIGS. 4A and 4B are curves and vector diagrams used for explaining the quantity of electricity to be given to the first winding of the pickup shown in FIG. 3;

Figure 1:
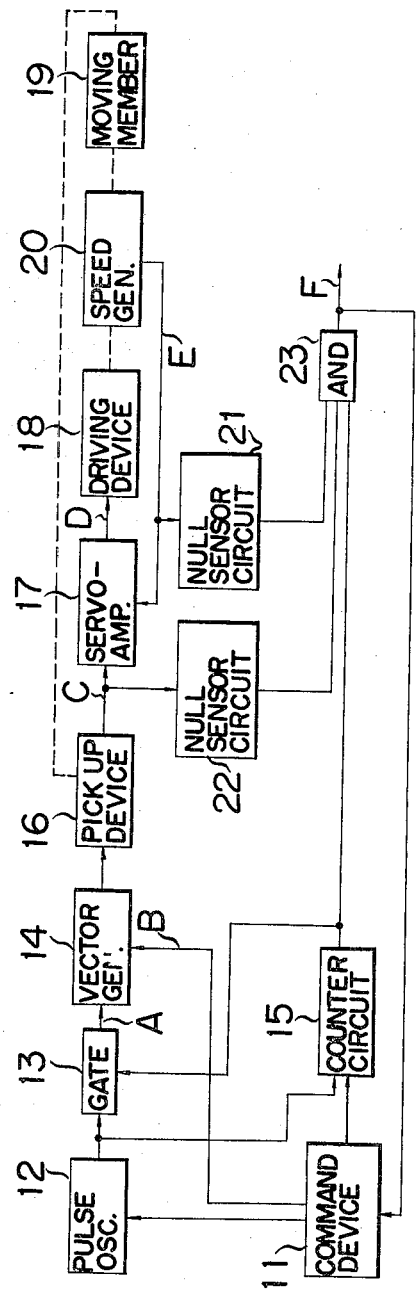
FIG. 1 is a schematic representation of an embodiment of the position control apparatus of this invention.
Figure 5A:
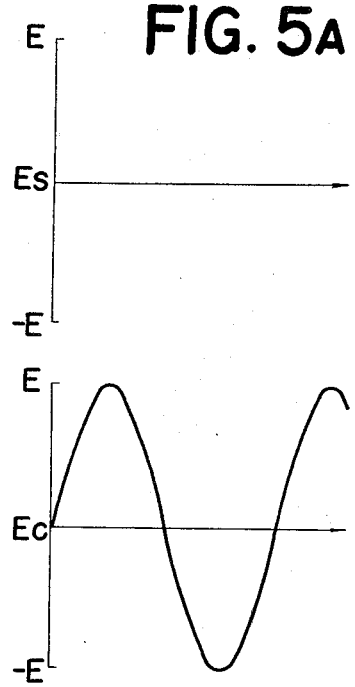
FIGS. 5A, 5B, 5C and 5D are the curve diagrams used for explaining quantities of electricity that correspond to the vectors shown in FIG. 4B, respectively.
Figure 5B:
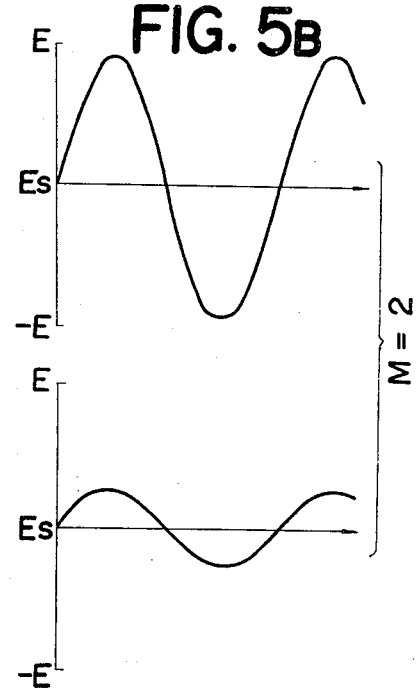
Figure 5C:
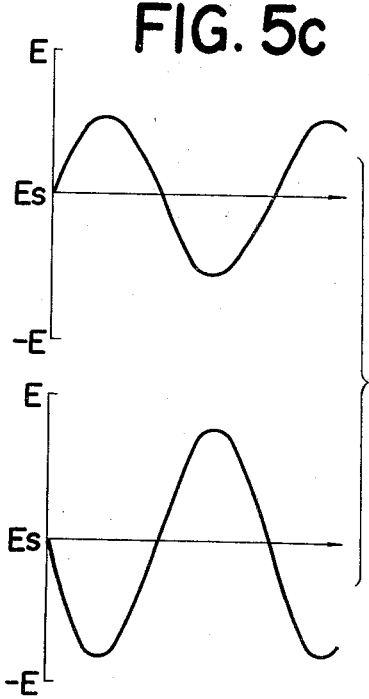
Figure 5D:
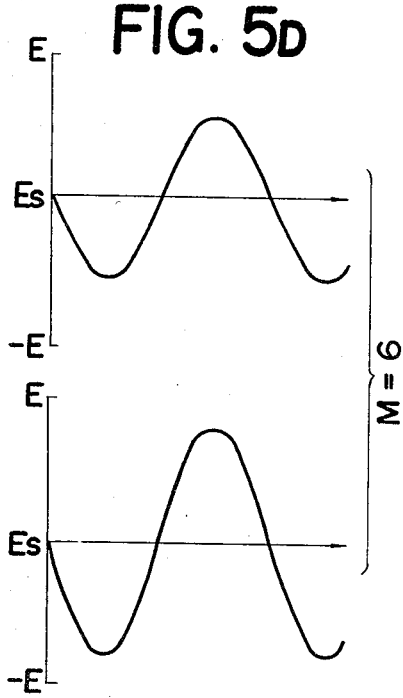

In FIG. 1, 11 is a command device which reads predetermined commands from tape, card, etc., memorizes it and issues various control commands according to the contents of the commands memorized. A pulse generator 12 generates a sequence of pulses based upon the control commands, and only those pulses of the pulse train that have passed a gate circuit 13 are fed to a vector generating circuit 14. The vector generating circuit 14 also receives a sign signal that indicates in which of the positive and negative directions the moving member should be shifted. In other words, the quantity of shift between the present position of the moving member and the next expected position thereof is proportional to the number of pulses applied to the vector generating circuit 14 and the direction of said shift is determined by the sign given to the vector generating circuit 14. In this sense, the number of the pulses and sign given to the vector generating circuit 14 can be called the incremental command information.

The opening and closure of the gate circuit 13 are controlled by a subtraction counter circuit 15 in order to control the number of pulses contained in the incremental command information. Command information is preset in advance on the counter 15 by control command from the command device 11, and then a 1 is subtracted from the above mentioned preset value every time the counter 15 receives a pulse from the pulse generator 12, and when the contents of the counter 15 is zero, an output is generated by the counter circuit 15 to close the gate circuit 13.

In this way the incremental command information is fed to the vector generating circuit 14 which generates a control signal which drives a position pickup device 16. The position pickup 16 which is mechanically connected to the moving member 19, produces an output that corresponds to the error of the actual position of the moving member from the objective position that corresponds to the command information. A servo amplifier 17 shifts the moving member 19 through the driving device 18 so that the said error will be zero.

A block 20 shows a speed generator mechanically connected to the moving member.

The position pickup 16 is a device such as a Resolver, Synchro or Inductosyn. It has first and second winding devices and derives a position signal as a quantity of electricity corresponding to the relative position of the second winding device with respect to the magnetic field generated by the first winding device.

In the present embodiment a device sold under the name of "Resolver" is used. A pair of windings 161 and 162 installed on the stator as shown in FIG. 3 are used as the first winding device and a winding 163 of the rotor connected mechanically to the moving member 19 is used as the second winding device. The device 14 which drives the present position pickup device 16 is shown in detail in FIG. 2.

Assuming that the alternating voltages $E_s$ and $E_c$ with an angular frequency $\omega$ as shown in the following formula are applied to the windings 161 and 162 of FIG. 3 respectively, $$E_s = E \sin \theta \cdot \sin \omega t \quad (1)$$
$$E_s = E \cos \theta \cdot \sin \omega t$$

where $\theta$ denotes the angle of the command vector (explained later) measured from Y axis in the clockwise direction.

Then the voltage $E_o$ induced in the winding 163 is obtained from the following formula:

$$E_o = E \cos(\varphi - \theta) \cdot \sin \omega t \qquad (2)$$

where $\varphi$ denotes the angle of the rotor measured in the clockwise direction from Y axis as shown in the drawing.

Therefore, when the rotor is rotated to satisfy the relationship formulated as follows, $E_o$ becomes null.

$$\varphi = \theta \pm \frac{2n+1}{2}\pi \qquad (3)$$

where $n$ is an integer.

Assume now $E_o = 0$ at $\theta = \theta_1$, i.e.

$$\varphi = \theta_1 + \frac{\pi}{2}$$

assume additionally that $\theta$ is changed from $\theta_1$ to $\theta_2$ on condition that the difference between $\theta_1$ and $\theta_2$ is smaller than $\pi$, then $E_o$ becomes not null. If the rotor is rotated so that $E_o$ becomes null, then $\varphi$ becomes $\theta_2 + \pi/2$. Hence $\varphi$ can be made to follow the change of $\theta$. In this embodiment the angle $\varphi$ of the rotor can be made to follow the command by performing that correspondence between the change of $\theta$ and the command information and that rotation of the rotor so that $E_o$ will be null. Since the rotor is rotated by the shift of the moving member, the moving member is positioned according to the command information.

In order to simplify explanation, one pulse applied to the vector generating circuit 14 is assumed to be corresponded to the rotor angle of 36° or $\pi/5$ radian hereinafter, that is, the operating range of the position pickup 16 is divided into 10 sections.

As shown in FIG. 2, the vector generating circuit 14 consists of a plurality of operational amplifiers provided with weighting resistors that can be changed over corresponding to the command information. In FIG. 2 the pulses applied through the path indicated by the symbol A are either added to or subtracted from the contents of a reversible counter 141 depending on whether the sign signal applied through the path indicated by symbol B is positive or negative through a polarity command device 142. Since one pulse applied through the path A is made to correspond to an angle of $\pi/5$ radian as mentioned previously, a rotor winding 163 of the position pickup 16 shown in FIG. 3 is controlled with a precision of 1/10 of its one rotation. Consequently, the moving member 19 mechanically connected to the rotor of the position pickup 16 is positioned by a unit shift required for rotating the rotor by 1/10 of one rotation. And let the shift quantity of the moving member that corresponds to one rotation of the rotor of the position pickup 16 be one division. Now one division consists of 10 sections. And let the reference position of the rotor be taken on the X axis shown in FIG. 3 and the reference position of the rotor and the position of the moving member at that time be expressed by 0 respectively and the positions of the rotor moved from the reference position by $\pi/5$, $2\pi/5$, $3\pi/5$, ... $8\pi/5$ and $9\pi/5$ are expressed by "1", "2", "3" ... "8" and "9" respectively. Then when the positioning of the moving element has been completed and the position controlling operation halts, the content M (an integer from 0 to 9) of the reversible counter 141 and the position of the moving member 19 within one division are in correspondence to each other. When the command for next incremental position is given through the paths A and B, the content M of the reversible counter 141 changes into the numeric value that indicates the next position to be occupied by the moving member 19. In this sense, the reversible counter 141 can be considered as a device that converts an incremental command given by the number of pulses into an absolute command information.

The absolute command information thus obtained is fed to a converter circuit 143 and converted into signals that switch the weighting resistors and inputs of operational amplifiers 144a and 145a. An operational circuit 144 contains a feedback resistor 40, four sets of gate circuits 41G, 42G, 43G and 44G controlled in their opening and closure by the output of the converter circuit 143, and the weighting resistors 41, 42, 43 and 44 that are connected in series to these gate circuits respectively. The operational amplifier 145 contains a feedback resistor 50, six sets of gate circuits 51G, 52G, 53G, 54G, 55G and 56G controlled in their opening and closure by the output of the converter circuit 143, and the weighting resistors 51, 52, 53, 54, 55 and 56 that are connected in series to these gate circuits respectively. A device 146 is a sine wave generator of an angular frequency $\omega$ and a device 147 is an inverter circuit that inverts the output of the device 146. The circuit 143 is so arranged that it produces an output (a) that opens the gate circuit 41G when the contents M of the reversible counter 141 are "1" and "4", an output (b) that opens the gate circuit 42G when the contents are "2" and "3", an output (c) that opens the gate circuit 43G when the contents are "6" and "9", an output (d) that opens the gate circuit 44G when the contents are "7" and "8", an output (e) that opens the gate circuit 51G when the content is "0", an output (f) that opens the gate circuit 52G when the contents are "1" and "9", an output (g) that opens the gate circuit 53G when the contents are "2" and "8", an output (h) that opens the gate circuit 54G when the contents are "3" and "7", an output (i) that opens the gate circuit 55G when the contents are "4" and "6", and an output (j) that opens the gate circuit 56G when the content is "5". To the gate circuits 41G, 42G, 51G, 52G and 53G is applied the alternating current of the generator 146 and to the gate circuits 43G, 44G, 54G, 55G and 56G is applied the alternating current from invertor 147 which is different in phase from the output of the generator 146 by $\pi$.

As is well known, such an operational amplifier is capable of changing the amplitude of the input signal depending on the relationships between the feedback resistor and weighting resistor. It is possible to obtain two kinds of signals that satisfy the relationships expressed by the Formula 1 as the outputs of the operational amplifiers by a switch circuit comprising the reversible counter 141 provided with polarity command device 142, 10 sets of gates selecting at least one of the weighting resistors to apply the sinusoidal signal with angular frequency $\omega$ to the operational amplifiers therethrough, and converter circuit 143 controlling the respective gate according to the command information.

This will easily be understood from the following description. Denote the contents of the reversible counter 141 with contents M and let $$\theta = \frac{\pi}{5}M$$

Then the portion of the Formula 1 that has no relation to time can be expressed as shown in FIG. 4A.

FIG. 4B shows the resultant vectors $V_0$ to $V_9$ formed by taking $E \cos(\pi/5M)$ and $E \sin(\pi/5M)$ on the Y and X axes respectively in vector form, taking into account the electrical arrangement of the windings 161 and 162 shown in FIG. 3. The suffixes of $V_0$ to $V_9$ coincide with the number M. As is easily understood from this FIG. 4B, the circuit shown in FIG. 2 is a simplified circuit formed by utilizing skillfully the symmetrical property of the components of the vectors $V_0$ to $V_9$.

The Formula 1 can be changed into the following when $E \sin \theta$ or $E \cos \theta$, the coefficient of the Formula 1 with respect to time, takes a negative value.

$$Es = E \sin \theta \sin(\omega t + \pi)$$
$$Ec = E \cos \theta \sin(\omega t + \pi) \qquad (1a)$$

It becomes necessary to shift the phase of the part concerned with time by $\pi$. In this case, the sign is reversed by the inverter circuit 147 shown in FIG. 2 to shift the phase of part concerned with time by $\pi$.

Therefore the voltages $E_s$ and $E_c$, that alternate at an angular frequency $\omega$ as shown in FIG. 5 can be obtained from the vector generating circuit 14 shown in FIG. 2 for cases where $M=0$, 2, 4 and 6. Consequently the first winding device of the position pickup 16 which is driven by these voltages, consisting of the windings 161 and 162, generates a magnetic field that corresponds to the vectors shown in FIG. 4B.

By this way, from the above description, the number $M$ is the content of the reversible counter 141, that is, the command information. Therefore, the vectors $V_0$ to $V_9$ shown in FIG. 4B correspond to the command information and the vectors of the magnetic field of the position pickup that correspond to the vectors $V_0$ to $V_9$ also correspond to the command information.

When an alternating current magnetic field expressed by the vectors that correspond to the command information is generated by the first winding device of the position pickup 16 in this way, a voltage $E_0$ as expressed by the Formula 2 is induced in the second winding device of the position pickup 16 depending on the position of the moving member 19 or $\varphi$ at the time.

The servo amplifier 17 and driving device 18, that shift the moving member 19 so that the voltage $E_0$ will be null, will be explained hereinafter.

The servo amplifier 17 consists, as shown in detail in FIG. 3, of a direction discriminating circuit 171 that discriminates whether the polarity of the signal from the position pickup 16 is positive or negative, amplifier 172, and servo valve 173 of the driving circuit of FIG. 1 that is driven by the output of the amplifier 172. Moreover, to the input side of the amplifier 172 is fed back negatively a quantity of electricity proportional to shifting speed of the moving member obtained from the speed generator 20 as shown by the path E in an attempt to stabilize the system. Moreover, as will be described in detail later, the outputs of the null sensor circuit 21 which produces an output when the output of the speed generator 20 is null, the null sensor circuit 22 which produces an output when the output of the position pickup is null, the voltage $E_0$ is null, and the output of the counter circuit 15 are led to the logical AND gate circuit 23. The appearance of all these outputs is detected and the output of the AND gate circuit 23 is made the in-position signal. This in-position signal is fed back to the command device 11. This signal can also be used as the control signal to other devices as indicated by the path F.

Now the operation of the devices will be explained. Firstly, assume that the content $M$ of the reversible counter 141 of FIG. 2 is zero, that is $\theta=0$, and that the moving member 19 is at the position corresponding to $\varphi=\pi/2$, that is "0" position. In this state magnetic field in position pickup 16 alternates with angular frequency $\omega$ corresponding to the vector $V_0$ shown in FIG. 4B and additionally assume that 4 pulses of positive direction are applied to the reversible counter 141. This results that the moving member 19 has received a command information to shift from the present "0" position to the position "4" of the section adjacent to the "0" position on the positive side.

When the first pulse is applied to the reversible counter 141, its content M becomes $M=1$ and the alternate current magnetic field corresponding to the vector $V_0$ shown in FIG. 4B is changed to the alternate current magnetic field that corresponds to the vector $V_1$, that is, its arrow head shifts in the positive direction (clockwise) by $\pi/5$. Therefore, the error between the present position and the position expressed by the command information, the output voltage $E_0$ of the position pickup 16 becomes $$E_0 = E \cos\left(\varphi - \frac{\pi}{5}\right) \cdot \sin \omega t$$

(where $\varphi = \pi/2$), and the moving member starts to be shifted in the positive direction to make this voltage null. In other words, the moving members starts to be shifted toward the position of $$\varphi = \frac{\pi}{2} + \frac{\pi}{5}$$

When the second pulse is applied to the reversible counter 141 in the course of time, the content $M$ of the counter 141 becomes 2, and the magnetic field of the position pickup becomes the magnetic field that is expressed by the vector that corresponds to the vector $V_2$ shown in FIG. 4B. Therefore the moving member is shifted toward $$\varphi = \frac{\pi}{2} + \frac{2\pi}{5}$$

When the third pulse arrives, the moving member 19 is shifted toward $$\varphi = \frac{\pi}{2} + \frac{3\pi}{5}$$

And the moving member 19 reaches these target values with a lag due to its inertia. Therefore, these pulses are required to be sent out so that the moving member will follow them within the predetermined lag. To meet this requirement the pulse generator 12 of FIG. 1 is designed to be controlled in its frequency by the command device 11 according to the schedule. It is desirable that the allowable lag is within $\pi/2$ radian. For, as is easily understood from examining the Formula 2, when the error exceeds $\pi/2$, the amplitude of the output voltage of the position pickup that picks up this error decreases.

In like manner, when the fourth pulse is applied to the reversible counter 141, its content M becomes 4, the moving member is shifted toward the target position "4" with a certain time lag and the positioning operation is completed.

When the positioning operation of the moving member has been completed, an output is produced from the AND circuit 23 and completion of the positioning can be detected. This is because the counter circuit 15 produces an output when the scheduled number of pulses have all been sent out, and because the output of the position pickup is null, that is, there is no error of the moving member 19 and the moving member 19 has halted.

When, for example, the moving member 19 has shifted beyond the target position, the null sensor 22 produces an output when the moving member reaches the position that corresponds to the command information. But since the moving member 19 is still in motion, the output of the speed generator 20 does not become null and, as a result, the null sensor 21 does not produce any output. Consequently the in-position signal is not transmitted until the moving member returns in the negative direction by the excessive quantity and halts at the target position. As can be understood from the preceding description, the signal obtained from the AND circuit 23 is a signal that discriminates the completion sure positioning of the moving member.

The above mentioned explanation holds true to the case in which the pulses in negative direction are applied to the vector generating circuit 14.

These points will be explained further referring to the example shown in the drawing because the explanation so far given is for a simplified system with a view to ease the understanding of the invention.

The position pickup 16 was used having its operation divided into 10 sections. It is advisable, however, to use the device 16 by dividing its operation into at least 100 sections. In other words, it is desirable to increase the number of vectors shown in FIG. 4B to about 100. The first step is to increase the number of weighting resistors of the operational amplifier shown in FIG. 2. The second step is to manipulate further the output of the operational amplifier of FIG. 2. Since the vectors $V_0$ to $V_9$ are the composite of $Es$ and $Ec$, it is sufficient, for 100 division interportion, to produce 10 vectors that are positioned, for example, between $V_1$ and $V_2$. This purpose is attained by either decreasing the component of the vector $V_1$ on Y axis direction or increasing the component of the vector $V_2$ on X axis direction. Since it is desirable that these vectors are equal to each other in magnitude to same degree, the components of the vectors in other directions than the ones mentioned above should be either increased or decreased simultaneously. Such a vector generating circuit can be formed by using operational amplifiers like the ones shown in FIG. 2. When employing the second step, the resultant number of division becomes the product of the number of division by this step and the number of division of the previous stage, for example 10 in the one shown in FIG. 2. Thus the number of division can be increased by simple means.

Such increase in the resolving power of the position pickup brings various advantages. Considered on the example shown in the drawing, it is natural that the precision of positioning is naturally increased if the entire shifting area corresponds to one rotation in the relative positional relationship between the first and second winding devices. When the entire shifting range corresponds to several rotations, in other words, when the shifting range of the moving member is divided into several sections, the number of sections required to obtain the same precision can be reduced. Moreover, the control to send out pulses that signifies the command to the reversible counter 141 of FIG. 2 retaining the error angles always within $\pi/2$ can be made easy.

For example, when a position pickup shown in FIG. 3 is used, the device is made to be controlled divided into 100 sections, and when the frequency of the oscillator 146 shown in FIG. 2 is set to 4 kc./s., the moving member surely follows the command even when the rate of pulse applied to the reversible counter 141 is at about 8 kc./s. The pulses applied to the reversible counter 141 are naturally required to increase their speed gradually, but when the speed reaches a certain predetermined speed, the moving member can be shifted at a error of about one pulse. In actual device, it is desirable in order to discriminate the failure in positioning to provide a sensing device which senses the error angle that means the difference between the content M of the reversible counter and the position of the moving member.

Since the moving member shifted following the sending out of the pulses that mean the command and applied to the reversible counter 141, the shifting speed of the moving member can be controlled easily.

Since the content M of the reversible counter 141 of FIG. 2 corresponds to the position of the rotor of the position pickup under in-position condition, it is possible to let the contents of counters be in one to one correspondence with the positions of the moving member if a carry circuit is provided to the reversible counter 141 to drive farther the counter for the above ranking digits. This may be very useful in such operations as adjustment.

While the invention has been described in connection with some preferred embodiments thereof, the invention is not limited thereto and includes any modifications and alterations which fall within the true spirit and scope of the invention.

What is claimed is:
1. Apparatus to control the position of a movable member comprising:
   means for supplying a command information signal, said command information signal including a number of pulses representing the desired amount of shift of said movable member and a sign signal representing the direction of said shift;
   means coupled to said supplying means for generating a control signal responsive to said command information signal;
   a position pickup device including first and second winding devices, one of which is coupled to said movable member and the other of which is energized by said control signal, for providing an output indicative of the error between the actual and desired positions of said movable member; and
   means coupled to said position pickup device to shift said movable member in a direction and by an amount which is a function of the output of said pickup device to reduce said error;
   the improvement wherein said control signal generating means comprises:
   means for generating a pair of alternating current signals which have opposite polarities;
   a plurality of operational amplifiers, each having a plurality of weighting resistors coupled to receive either of said alternating current signals;
   a switching device selectively coupling at least one of said alternating current signals to said operational amplifiers through at least one of said weighting resistors in accordance with said command information signal;
   means coupling the outputs of said operational amplifiers to said position pickup device, the outputs of said operational amplifiers representing said control signal.

2. Apparatus according to claim 1 comprising means coupled to said pickup device for causing said movable member to cease moving when the output of said second winding device of said position pickup device is zero.

3. Apparatus according to claim 1 wherein the output of said second winding device becomes null when said movable member reaches the desired position.

4. Apparatus according to claim 3 wherein said means for causing said moving member to cease moving includes:
   means sensing the cessation of movement of said movable member; and
   logic means coupled to said sensing means, to said position pickup device and to said supplying means for indicating completion of the position controlling operation when the movable member has ceased moving, when the output of said position pickup device has become null and when all the pulses comprising said command information signal have been sent to said switching device.

5. Apparatus according to claim 4 wherein said sensing means includes means for generating a signal which is a function of the speed of movement of said movable member.

References Cited

UNITED STATES PATENTS 3,003,094 10/1961 Gough _____ 318—28 XR
3,175,138 3/1965 Kilroy et al. _____ 318—18 XR BENJAMIN DOBECK, Primary Examiner U.S. Cl. X.R.
318—28